United States Patent [19]

Nolan, Jr.

[11] Patent Number: 5,146,575
[45] Date of Patent: Sep. 8, 1992

[54] IMPLEMENTING PRIVILEGE ON MICROPROCESSOR SYSTEMS FOR USE IN SOFTWARE ASSET PROTECTION

[75] Inventor: Thomas J. Nolan, Jr., Mahopac, N.Y.

[73] Assignee: International Business Machines Corp., Armonk, N.Y.

[21] Appl. No.: 927,286

[22] Filed: Nov. 5, 1986

[51] Int. Cl.[5] ............................................. G06F 12/14
[52] U.S. Cl. ................................ 395/425; 364/230.4; 364/228.6; 364/246.6; 364/230; 364/DIG. 1; 395/658
[58] Field of Search ... 364/200 MS File, 900 MS File; 380/25, 23; 395/425, 650

[56] References Cited

U.S. PATENT DOCUMENTS

| | | | |
|---|---|---|---|
| 4,104,721 | 8/1978 | Markstein | 364/200 |
| 4,139,893 | 2/1979 | Poland | 364/200 |
| 4,168,396 | 9/1979 | Best | 178/22 |
| 4,183,085 | 1/1980 | Roberts et al. | 364/200 |
| 4,184,201 | 1/1980 | Melberg | 364/200 |
| 4,228,496 | 10/1980 | Katzman | 364/200 |
| 4,278,837 | 7/1981 | Best | 364/900 |
| 4,328,542 | 4/1982 | Anastas et al. | 364/200 |
| 4,386,399 | 5/1983 | Rasala | 364/200 |
| 4,386,416 | 5/1983 | Giltner | 364/900 |
| 4,394,734 | 7/1983 | Norgren et al. | 364/200 |
| 4,433,207 | 2/1984 | Best | 178/22.09 |
| 4,442,484 | 4/1984 | Childs | 364/200 |
| 4,465,901 | 8/1984 | Best | 178/22.08 |

(List continued on next page.)

OTHER PUBLICATIONS

Best, "Preventing Software Piracy with Crypto-Microprocessors", IEEE, 1980.
Everett, "Padlock", Computer Bulletin, Mar. 1985/Software Protection, Open Computer Security.
Kent, "Protecting Externally Supplied Software in Small Computers", Ph.D. Thesis, M.I.T., 1980.
Purdy et al, "A Software Protection Scheme", IEEE, 1982.
Simmons, "How to (Selectively) Broadcast a Secret", IEEE, 1985.

Primary Examiner—Thomas C. Lee
Assistant Examiner—Eric Coleman
Attorney, Agent, or Firm—Pollock, Vande Sande & Priddy

[57] ABSTRACT

A dual privilege level coprocessor which is especially suited for use in a software asset protection system is described. The coprocessor includes a supervisor processing element and an application processing element. The supervisor processing element includes a supervisor processor and dedicated supervisor random access and read only memory. The application processing element includes an application processor, an application random access memory, a secure random access memory, a low privilege read only memory, and a high privilege read only memory. An internal bus couples the supervisor processor, application processor, high and low privilege random access memories, application random access memory and secure random access memory. The high privilege read only memory and the secure random access memory are enabled only in response to dedicated control signals from the supervisor processor. While the application processor in combination with the low privilege random access memory has many general purpose computing capabilities, it is incapable of executing input or output operations. An input-/output device is also coupled to the bus and controlled by the supervisor processor. The secure random access memory is provided for storage of sensitive information such as decryption keys. The coprocessor implements a low privilege level of operation for the purpose of executing protected software which is first decrypted under the control of the supervisor processor and then stored in the application processor random access memory. The coprocessor is also capable of high privilege operation either by the supervisor processor alone or with the supervisor processor controlling the application processor.

22 Claims, 4 Drawing Sheets

U.S. PATENT DOCUMENTS

| | | | |
|---|---|---|---|
| 4,471,163 | 9/1984 | Donald | 178/22.08 |
| 4,519,032 | 5/1985 | Mendell | 364/200 |
| 4,521,853 | 6/1985 | Guttag | 364/200 |
| 4,523,271 | 6/1985 | Levien | 364/200 |
| 4,525,599 | 6/1985 | Curran | 178/22.08 |
| 4,558,176 | 12/1985 | Arnold et al. | 364/900 |
| 4,562,306 | 12/1985 | Chou | 364/200 |
| 4,573,119 | 2/1986 | Westheimer | 364/200 |
| 4,583,196 | 4/1986 | Koo | 364/900 |
| 4,621,321 | 11/1986 | Boebert | 364/200 |
| 4,633,388 | 12/1986 | Chiu | 364/200 |
| 4,636,947 | 1/1987 | Ward | 364/200 |
| 4,644,493 | 2/1987 | Chandra | 364/900 |
| 4,649,233 | 3/1987 | Bass et al. | 380/25 |
| 4,652,990 | 3/1987 | Pailen | 364/200 |
| 4,691,355 | 9/1987 | Wirstrom | 380/23 |
| 4,757,468 | 8/1977 | Domenik et al. | 380/4 |
| 4,757,533 | 7/1988 | Allen | 380/25 |
| 4,757,534 | 7/1988 | Matyas | 385/25 |
| 4,764,959 | 8/1988 | Watanabe et al. | 380/23 |
| 4,791,565 | 12/1988 | Dunham | 364/200 |
| 4,797,928 | 1/1989 | Dykes | 380/21 |
| 4,864,494 | 9/1989 | Kobus | 364/200 |
| 4,866,769 | 9/1989 | Karp | 380/4 |
| 4,876,716 | 10/1989 | Okamoto | 380/21 |
| 4,908,861 | 3/1990 | Brachtl | 380/25 |
| 4,910,773 | 3/1990 | Hazard | 380/21 |
| 4,932,054 | 6/1990 | Chou | 380/4 |
| 4,959,861 | 9/1990 | Howlette | 380/4 |

IMPLEMENTING PRIVILEGE ON MICROPROCESSOR SYSTEMS FOR USE IN SOFTWARE ASSET PROTECTION

TECHNICAL FIELD

The invention is in the field of data processing, and particularly with respect to a software copy protection mechanism. That mechanism requires a two privilege state processor, and the present invention provides a dual privilege processor which can be implemented using currently available low cost processors which inherently do not provide the desired multi-level privilege structure.

CROSS-REFERENCE TO RELATED APPLICATIONS

Reference is made to the following co-pending applications, assigned to the assignee of this application:

U.S. patent application Ser. No. 927,309, filed Nov. 5, 1986; U.S. patent application Ser. No. 927,306, filed Nov. 5, 1986 now U.S. Pat. No. 4,916,738; U.S. patent application Ser. No. 927,629, filed Nov. 5, 1986 now U.S. Pat. No. 4,817,140; U.S. patent application Ser. No. 927,298, filed Nov. 5, 1986 now U.S. Pat. No. 4,860,351; U.S. patent application Ser. No. 927,297, filed Nov. 5, 1986 abandoned; and U.S. patent application Ser. No. 927,299, filed Nov. 5, 1986 abandoned.

BACKGROUND

Copending application Ser. No. 06/927629, filed Nov. 5, 1986, now U.S. Pat. No. 4,817,140, the disclosure of which is incorporated by this reference, describes a software copy protection mechanism which is unique in that it segregates the right to execute a particular piece of application software from a copy of the software itself. The software is protected to the extent that it is distributed in encrypted form. The protected software is executable on a composite computing system including a conventional host (which may be a mainframe computer although typically it would be represented by a PC) in combination with a physically and logically secure coprocessor. The logically and physically secure coprocessor basically performs two essential functions. The coprocessor stores a software decryption key (AK) for a protected application in secure, non-volatile storage; the software decryption key (AK) when installed in a coprocessor represents the user's right to execute the protected application. The coprocessor also effects the decryption and execution of the protected application, and thus while it provides to the host the results of execution of the protected application, the protected application itself is maintained secure.

Typically, the protected application will be represented on a distribution media in at least two files, a first file of plain text software, which (to the extent it is present) is executed on the host, and a second file of encrypted software which will be executed on the coprocessor. The coprocessor, since it has access to the software decryption key, can read the software portion provided in encrypted form, and decrypt it so that its random access memory stores the protected software in plain text form. The physical and logical security provided by the coprocessor prevents the user (or a pirate) from obtaining access to clear text of the protected application. The coprocessor executes the protected application, passing only results onto the host. In this fashion, the entire application is executed but the user never has access to the protected application in plain text or executable form.

The present invention is directed at a simple, low cost implementation of the coprocessor, with respect to its logical security.

Processors exhibiting multiple privilege levels have been known in the prior art. With the introduction of multi-processing, the mainframe computer field found a need for implementing privilege structure at least to ensure that user #1's program and/or data did not interfere with or be interfered by user #2's program or data. In many cases the privilege structure was implemented in software. In the past, in the mainframe computing field, the software privilege structure was feasible because the system programmers and system operators were part and parcel of the security system and they would ensure that application programs complied with the necessary privilege structure.

There are processors which provide multi-level privilege structures, but those are too costly for use in such low cost applications as the present invention is directed at. The function of the privilege structure in prior art systems has been the separation of execution spaces of multiple users to insure meaningful, orderly, nondestructive use and allocation of system processing resources but not for copy protection of software. These do not always exhibit open architecture.

For the software asset protection mechanism described in application Ser. No. 927629, now U.S. Pat. No. 4,817,140 to be widely applied, the architecture of the coprocessor must be open to allow widespread use; this necessarily requires that the coprocessor and its instruction set will be widely known. Without some form of privilege structure, an application program could be written which would access information violating the security requirements, such as decryption keys, or the plain text version of protected software.

More particularly, as described in application Ser. No. 927629, now U.S. Pat. No. 4,817,140, the coprocessor must provide functions and data which are not available to the user. These include data encryption and decryption, the right to execute a specific application, and encryption keys. The coprocessor, in addition to implementing security, must also be capable of general purpose computing tasks since the protected portion of any application is intended to be executed on the coprocessor.

Accordingly, it is an object of the invention to provide, in accordance with a software asset protection mechanism, logical security for a coprocessor, which coprocessor is capable of general computing tasks. It is another object of the invention to provide logical security for such a coprocessor notwithstanding the fact that the internal architecture and instruction set for the coprocessor are expected to be widely circulated and known. It is another object of the present invention to provide a coprocessor for such a software asset protection mechanism which is capable of storing and using rights to execute implemented in the form of software decryption keys, but which prevent the user from obtaining access to any software decryption key. It is another object of the present invention to provide such a secure coprocessor which, in the course of executing protected software, will decrypt and store that software in plain text form, but which will deny access to the user to plain text of protected software. It is another object of the invention to provide such a coprocessor notwithstanding the fact that the architecture and instruction set of the coprocessor are widely known.

SUMMARY OF THE INVENTION

The invention meets these and other objects by structuring the coprocessor so that it consists of two processing elements; one of those two processing elements, referred to hereinafter as the application processor (AP) is actually used to execute the protected application, and a second processor element, hereinafter referred to as the supervisor processor (SP) is used to control the privilege state of the coprocessor consisting of both the AP and SP.

The coprocessor includes an I/O service element with an I/O terminal; the I/O service element is controlled by the SP. In accordance with the invention the SP is responsible for communication with the host and performing tasks based on commands it receives. These tasks include changing the privilege state, data encryption/decryption, and transfer of privilege. The instructions the SP is capable of responding to are defined and those definitions are stored in a secure ROM, such that they cannot be modified by external commands. To further ensure security of the SP, it fetches instructions only from its secure ROM. Data may be fetched or stored to its internal register file or external random access memory. On the other hand, the AP is, for the most part, a general purpose processor since it must execute application code, and is capable of fetching instructions and/or data in RAM or ROM. The RAM and/or ROM used by the AP is logically and/or physically separate from that of the SP. While the AP can perform many general purpose computing functions, it has no I/O capability and thus cannot transfer to the host any data or software. When the host computer requests execution of a protected program, the first function of the SP is to clear the AP RAM; thereafter the SP reads the encrypted application code and employing the appropriate software decryption key, stores the decrypted application code in the AP RAM. The SP then issues a start instruction to the AP. Since the AP does not have access to the SP memory, programs written to defeat the security system cannot read or transfer data such as encryption keys or the right to execute applications. The SP is programmed to transfer to the host only the results of processing information from the AP memory.

Accordingly, the invention provides a logically secure processor with an I/O terminal for input or output operations with protection from allowing access to protected data stored in the processor. The logically secure processor comprises an application processor for executing software in accordance with a first set of executable operations.

The apparatus further includes a supervisor processor coupled to and controlling the application processor and a system bus coupled to both the supervisor and application processor. The apparatus further includes an I/O terminal coupled to and controlled by the supervisor processor. The apparatus further includes a secure read only memory device and a secure read/write memory device. These are coupled to the system bus and controlled by the supervisor processor. The secure read only memory has contents defining a second set of operations executable by the application processor only when the secure memory devices are enabled by the supervisor processor. Thus, the application processor, in responding to external commands via the system bus, is prohibited from performing operations requiring access to the secure read only memory device or secure read/write memory device, absent enablement of the secure memory devices by the supervisor processor.

In the foregoing description the first set of executable operations (those performable by the application processor) are typical of general data processing techniques except that the first set of executable operations does; not include input or output operations.

In general, the logically secure processor operates in one of two privilege states, a high privilege state or a low privilege state. In the low privilege state, essentially the only function being performed is executing protected software by the application processor. While the protected software is stored in random access memory available to the application processor (as it must be for the application processor to execute it), the inability of the application processor to output any information ensures that the protected application is secure from access by the user, or anyone else, via the application processor. Since the application processor is controlled by the supervisor processor, the application processor is only initiated into operation by action of the supervisor processor. Furthermore, as a protection mechanism, prior to loading a protected application in the application processor random access memory, the supervisor processor clears that memory. The low privilege state of operation of the secure processor can be considered a service to the software vendor, since while it provides the user with the right to execute the software, it protects that software from unauthorized access (as a service to the software vendor).

The logically secure processor also operates in a high privilege state, the high privilege state can be considered a service to the hardware vendor in that it guarantees the security offered, from the hardware vendor to the collection of software vendors. In the high privilege state, the logically secure processor is capable of manipulating rights to execute, i.e. acquiring rights and transferring rights, which necessarily requires manipulation of decryption keys stored in a secure random access memory. While the secure random access memory which provides for storage of decryption keys could be arranged to be solely accessible by the supervisor processor, such architecture would require that the supervisor processor per se be capable of itself performing all those functions necessary to decryption key management. As described in this application, however, such architecture could be considered inefficient since the application processor is already available and, as already indicated, has general computing capabilities. Accordingly, the secure random access memory is arranged so as to be accessible to the application processor, along with a secure read only memory. While both such memories are accessible to the application processor, access to those memory devices is controlled by the supervisor processor. More particularly, both the secure random access memory and the secure read only memory respond to enable signals from the supervisor processor, and only in the presence of an appropriate enabling signal from the supervisor processor, can the application processor access these memory devices. The secure read only memory device in effect defines a second set of executable operations performable by the application processor; the second set of executable operations includes those operations whose execution is required from the coprocessor in the high privilege state. The high privilege state is characterized by those operations which require decryption key management, transfer or manipulation. Security for this sensitive data is assured by the requirement for the presence of an enabling signal generated by the supervisor processor before such data is accessible.

Finally, the supervisor processor, which controls all of the foregoing functions, has access to dedicated random access and read only memory devices, i.e. devices not accessible by the application processor.

Thus, the dedicated read only memory defines a third set of executable operations performable by the supervisor processor including changing privilege levels, I/O operation and at least supervisor of key management.

BRIEF DESCRIPTION OF THE DRAWINGS

The present invention will now be described in such further detail so as to enable those skilled in the art to practice the same, in the following portions of this specification when taken in conjunction with the attached drawings in which like reference characters identify identical apparatus and in which.

DETAILED DESCRIPTION OF PREFERRED EMBODIMENTS

Figure 1:
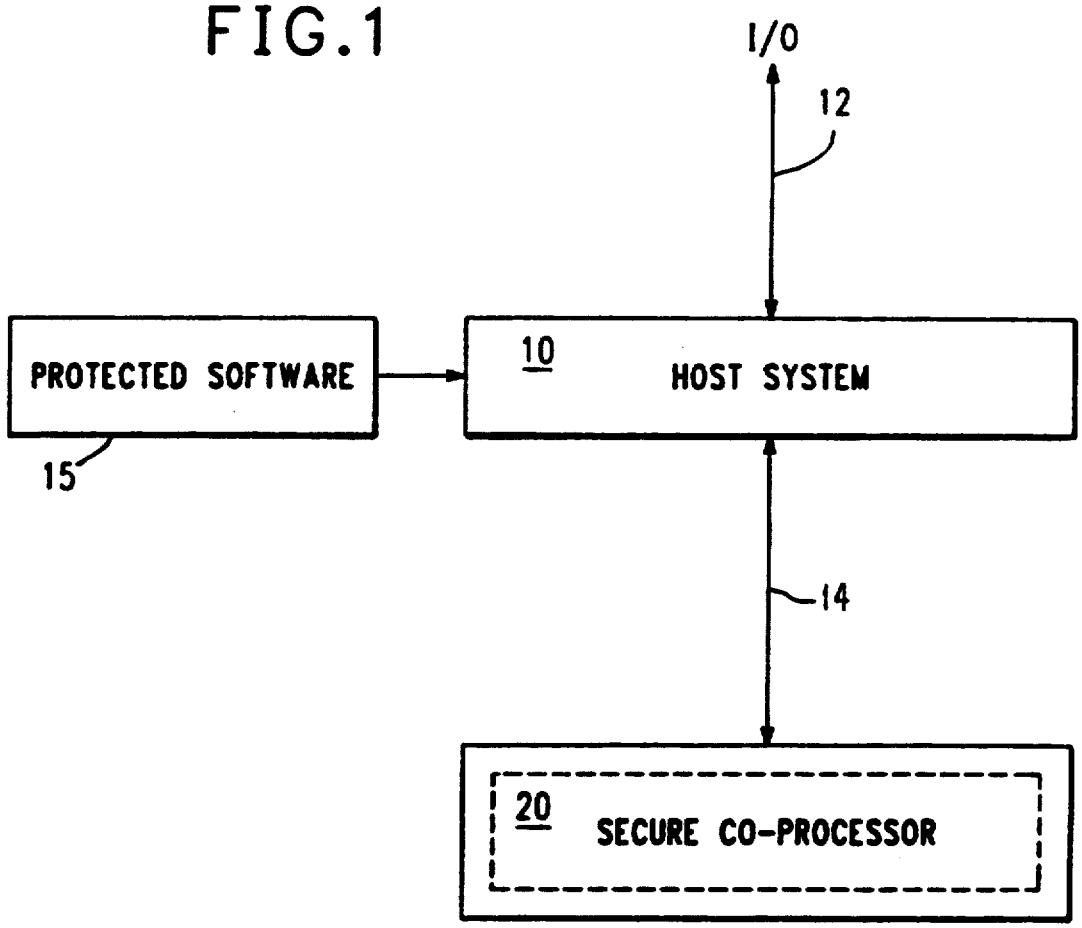
FIG. 1 is a block diagram showing a typical application of the logically secure processor of this invention.

FIG. 1 shows a combined processing system suitable for implementing the software asset protection mechanism of copending application Ser. No. 06/927629. In particular, the combined processing system includes a host system 10 which may be a mainframe computer, although in the typical application it will be a PC such as the IBM PC. A secure coprocessor 20 is capable of communicating, bidirectionally, with the host system 10 via a communication link 14. The secure coprocessor 20 in accordance with the invention is physically secure; that security is denoted by the dashed rectangle interior of the borders in the coprocessor 20. Such physical security can be provided in accordance with the techniques described in applications Ser. No. 06/927309, filed Nov. 5, 1986 and Ser. No. 06/927298 filed Nov. 5, 1986, the disclosures of which are incorporated herein by this reference, or other techniques. The host system 10 has an I/O path 12. Other peripheral components which may be associated with the host system 10 and/or the secure coprocessor 20 are not specifically called out in FIG. 1; reference is made to copending application Ser. No. 06/927629 for a more detailed illustration of such peripheral equipment.

The protected software 15 is made available to the host system 10; because of the characteristics of the protected software 15, the user of the host system 10 does not have access to that application in plain text form. Allowing the user access to the application in plain text form would enable him to duplicate usable copies of the software. Rather, the protected software includes at least an encrypted portion; and it is the encrypted portion which is subject to the protection of the software asset protection mechanism described in copending application Ser. No. 06/927629. In accordance with this software asset protection mechanism, the secure coprocessor 20 may store a distinct right to execute, represented in the form of a software decryption key; how that distinct right to execute is transferred to the secure coprocessor 20 is described in the copending application Ser. No. 06/927629. When the user desires execution of the protected application, a utility program running in the host 10 signals the secure coprocessor 20 that a Load-Decrypt-Run (LDR) sequence is to begin. As part of that sequence, the encrypted portion of the application is transferred to the secure coprocessor 20 and therein it is decrypted. At various times during execution of the application, the secure coprocessor 20 may be called on to execute the protected portion of the application, passing results onto the host system 10. Accordingly, the logical characteristics of the secure coprocessor 20 play a large role in implementing the software asset protection mechanism. In particular, the software decryption key or keys which may be stored in the secure coprocessor 20 should be, and remain, unavailable to the user (access by the user to any of the software decryption keys would allow the user to decrypt the corresponding protected application portion, which would defeat the software asset protection mechanism) and the decrypted form of the protected portion of the application, which is stored in the read/write memory of the secure coprocessor 20, should also be unavailable to the user; only the results of the execution of that software should be provided to the user. As has already been mentioned, the physical security of the coprocessor 20 is beyond the scope of the present invention. The logical security of the coprocessor 20 is the subject of this invention.

Figure 2:
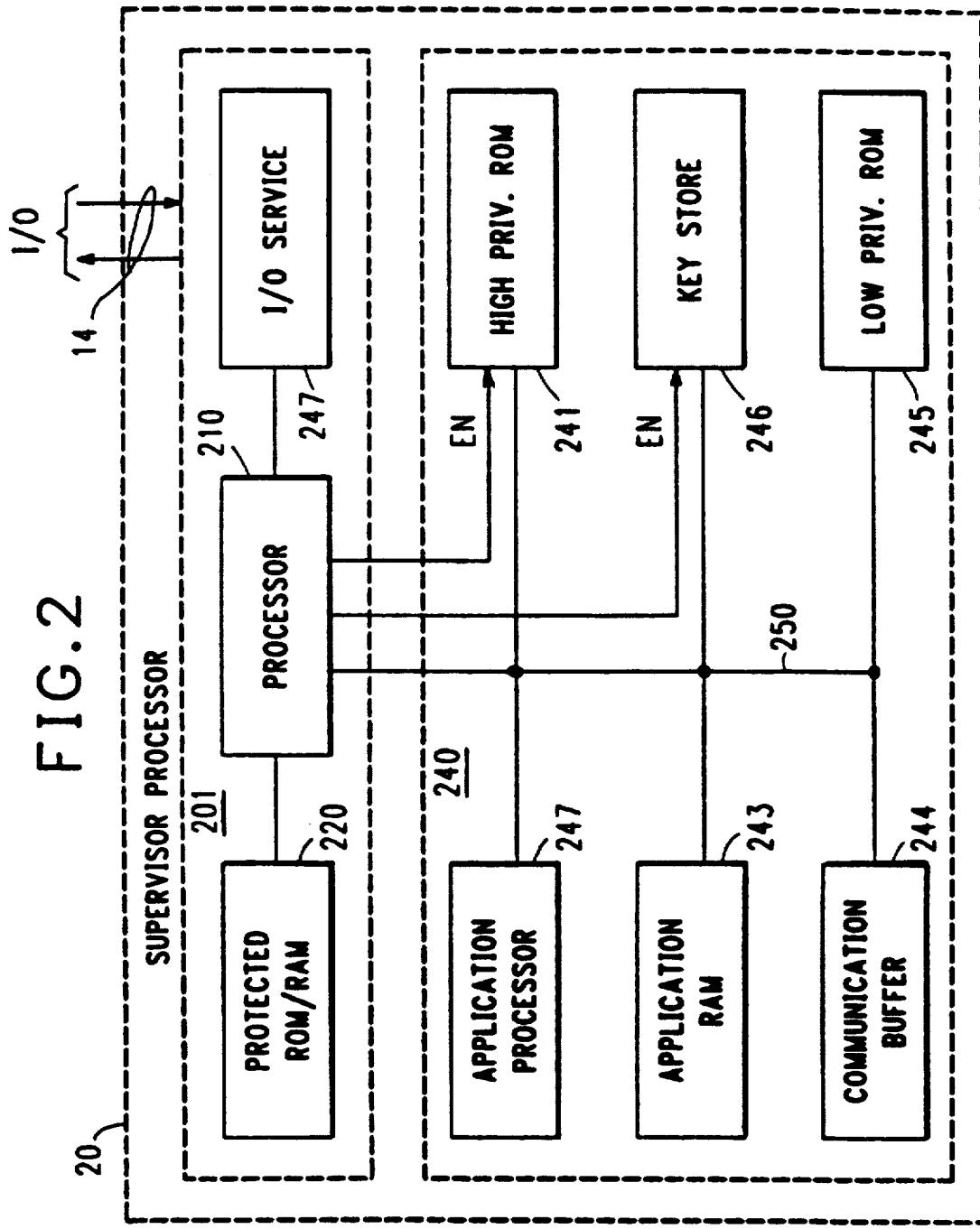
FIG. 2 is a detail block diagram of one embodiment of a logically secure processor in accordance with this invention.

FIG. 2 is a block diagram showing a logically secure coprocessor 20 in accordance with the present invention. More particularly, the secure coprocessor 20, as seen in FIG. 2, includes a supervisor processor element 201 and an application processor element 240; as shown in FIG. 2 both elements 201 and 240 are protected by the physical security. More particularly, the supervisor element 201 includes a processor 210 and protected memory 220. Protected memory 220 includes both read only memory as well as read/write memory. The only access to the protected memory 220 is from/to the supervisor processor 210.

The application processor element 240 includes a number of components; specifically an application processor 242, a high privilege read only memory 241, a low privilege read only memory 245, a random access AP memory 243, a key storage memory 246 and a communications buffer 244. All of the foregoing elements communicate among each other and with the processor 210 via an internal bus 250. Two of the foregoing memories, specifically the high privilege read only memory 241 and the key store 246 have, in addition to address input and output terminals, an enable terminal (EN) which is controlled by the supervisor processor 210. Only in the presence of a predetermined enable signal at the EN terminal, will the corresponding memory respond to its address inputs with information output. The application processor element 240 also includes an I/O service element 247. The I/O service element 247 in turn is the link to the bidirectional communication link 14 through which the secure coprocessor 20 communicates with the host system 10. Only in the presence of a predetermined enable signal from the SP, at the EN terminal of the I/O service element, will the I/O service element respond.

Of the various tasks executed by the supervisor processor 210 and the application processor 242, the supervisor is responsible for communication with the host 10 and performing tasks based on the commands it receives. These tasks include changing the privilege state of the secure coprocessor 20 (between distinct high privilege and low privilege states), data encryption/decryption and privilege transfers; for the latter function see in particular copending application Ser. No. 06/927299 filed Nov. 5, 1986, disclosure of which is incorporated herein by this reference. The particular functions of the supervisor processor 210 are defined in the read only memory portion of the protected memory 220 and hence are not modifiable by any external agency or command. The supervisor processor 210 fetches instructions only from the read only memory portion of the memory 220; the supervisor processor 210 may fetch data from or store data to its internal register file or an external random access memory portion of the protected memory 220. Supervisor processor 210 may also store data in any of the elements 243, 244, 246 as is permitted by its instruction set.

On the other hand, the application processing element 240 is a general purpose processor since it must execute application code and is capable of fetching instructions and/or data from either read/write memory or read only memory. Memory employed by the application processor 242 is logically and/or physically separate from the protected memory 220.

In general when the host 10 requests execution of a protected program, the supervisor processor 210 responds by first clearing the application processor random access memory 243. The supervisor processor 210 then fetches (for example from the application disk) the encrypted portion of the application and, employing the appropriate software decryption key, access from the key store 246, the encrypted application portion is decrypted and stored in the application processor RAM 243. It will be understood that the fetch may be indirect via host 10 as described in Ser. No. 06/927629. The supervisor processor 210 then issues a start instruction to the application processor 242. The supervisor processor 210 also supervises the output operation, transferring results from the execution by the application processor 242 via the I/O service element 247 to the host 10.

During the course of its execution, the application processor 242 of course executes the protected application from RAM 243. Because of the interconnections of the various elements, there are some things the application processor 242 is simply incapable of achieving. For example, the application processor 242 cannot transfer any keys from the key store 246, since the key store 246 can only be enabled by the supervisor processor 210.

The foregoing is an example of the application processor 242 working in a low privilege state. In that state any request, for example by the host 10, to read the protected memory 220 of the supervisor, would not be honored since the supervisor is programmed to transfer only information from the application processor RAM 243. Other illegal commands that might be issued by the host 10 would require the supervisor 201 to output decryption keys; again the supervisor 201 would merely clear the AP RAM 243 and wait for a new command.

While the supervisor processor 210 may have general purpose processing capabilities, those capabilities are not essential (though they are preferred). The supervisor processor 210 can call on the application processor 242 to perform selected tasks for it; these tasks can involve high privilege information, such as manipulation of decryption keys and the like since the supervisor 201 can require the application processing element 240 to operate in a high privilege state. In this state, the application processing element 240 executes instructions contained solely in the high privilege ROM 241, and of course the high privilege ROM 241 would prohibit the application processor 242 from outputting high privilege information such as decryption keys to the host 10. Thus, the supervisor element 201, by controlling the addressability of the application processing element 240, allows the processing power of the application processing element 240 to be applied to security or high privilege tasks. The application processor 242 and supervisor processor 210 can communicate either via the bus 250 or through the communication buffer 244; and it should be understood that the communication buffer 244 can correspond to a dedicated RAM location.

As thus far described, the invention has the advantage of being simple to construct from currently available microcircuits, which in themselves inherently have no privilege structure but yet the coprocessor 20 shown in FIG. 2 does possess a dual privilege structure, as described.

Figure 3:
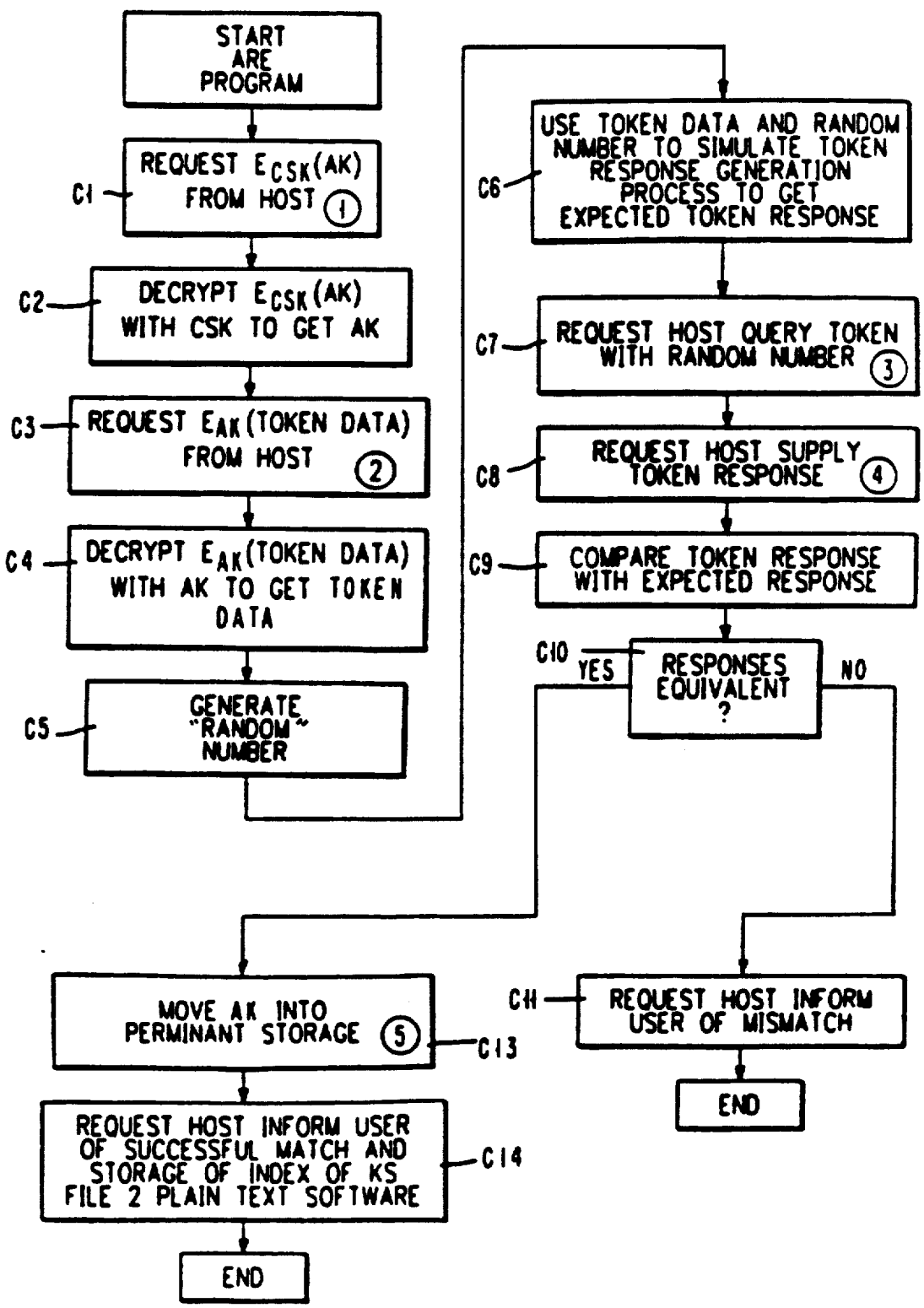
FIGS. 3 and 4 are respectively copies of FIGS. 8 and 9B from copending application Ser. No. 927629 describing functions required of the coprocessor.

FIG. 3 corresponds to FIG. 8 in copending application Ser. No. 06/927629 and describes the functions executed by the coprocessor 20 in order to perform an Acquire-Right-to-Execute function. In order to acquire a right to execute, the coprocessor 20 must have access to at least three files of information, the protected application, encrypted under a software decryption key AK, the software decryption key itself encrypted under the hardware vendor's key CSK and a third file which is used to authenticate the user's right to execute in connection with a use once token. As shown in FIG. 3, functions C1 and C2 acquire the encrypted decryption key and, employing the hardware vendor's key CSK (provided as part of the secure memory of the coprocessor), decrypting the software decryption key AK. Steps C3-C10 authenticate the user's right to execute; if that right is considered valid, functions C13 and C14 are performed and, on the other hand, if that right is not considered valid then function C11 is performed. Successful conclusion of the ARE sequence leaves the secure key storage memory 246 in a different condition than it was in prior to operation of the sequence; that difference is the presence, in that memory, of the software decryption key AK. At least the functions C2 and C13 require the coprocessor 20 to access the secure key storage 246 and, for that reason, the ARE sequence is considered a high privilege operation. While the supervisor processor 210 could theoretically perform all these functions wholly divorced from the application processor 242, it is an advantage of the invention that the application processor 242 could execute many if not all the functions so long as it was properly authorized by the supervisor processor 210. That authorization would include at least enabling the high privilege read only memory 241 and the secure key storage memory 246.

Figure 4:
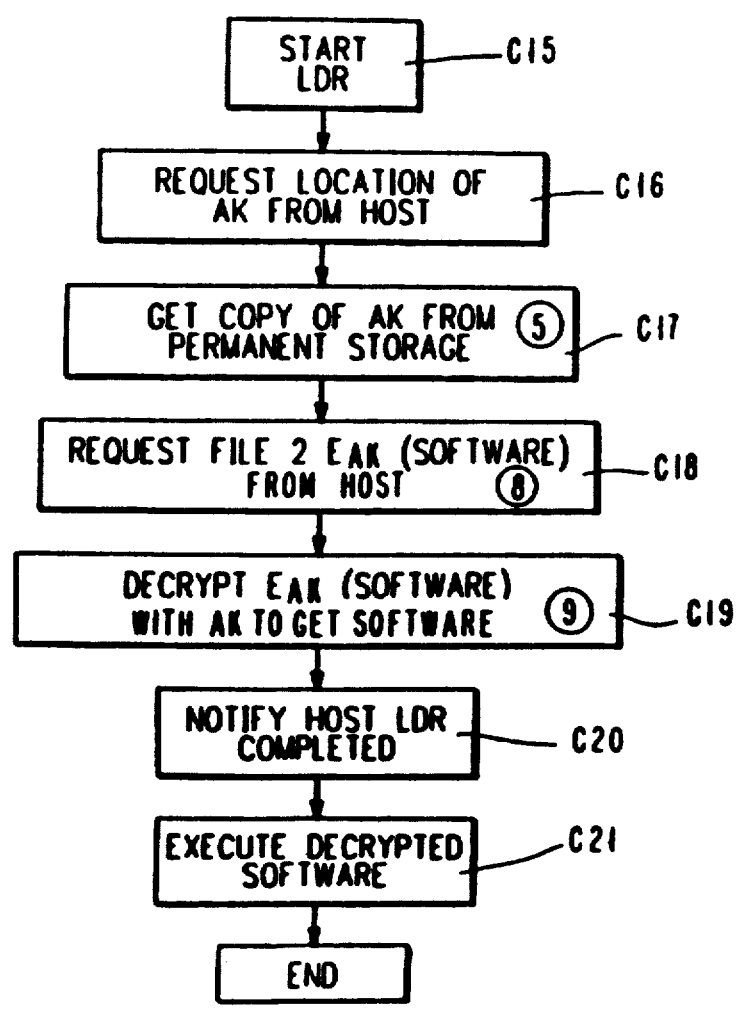

Once the coprocessor 20 has acquired the right to execute (stored the application decryption key AK in its secure key storage memory 246), when a user requests execution of the protected application the sequence shown in FIG. 4 is executed.

Referring to FIG. 4, functions C16 and C17 identify the particular software decryption key (if there is more than one) and access it from the secure key storage memory 246. With access to the decryption key AK, functions C18 and C19 obtain the encrypted protected application and (C19) decrypt that application. Function C19 includes (although it is not expressly shown in FIG. 4) the preparatory function of clearing the application processor random access memory 243, preparatory to loading the decrypted software therein. Function C21 is the execution, by the application processor, of the decrypted software.

Inasmuch as the functions C16–C19 require access to the key storage memory 246, these functions come within the ambit of high privilege operation and accordingly supervisor processor 210 permission is required for their execution. While it is within the scope of the invention to have these functions performed by the supervisor processor 210, it is also within the scope of the invention to enable the application processor to perform these functions under the supervision of the supervisor processor 210. Function C21, on the other hand, is a low privilege operation and is executed by the application processor. To the extent that function C21 requires transmission of execution results from the application processor element 240 (and specifically from the AP RAM 243) to the host 10, that I/O operation is executed by the supervisor processor 210.

Having thus described my invention, what I claim as new, and desire to secure by Letters Patent is:

1. A logically secure processor with an I/O terminal for input or output operations with security for protected data stored in said processor comprising:
   application processor means for executing software in accordance with a first set of operations,
   supervisor processor means coupled to and controlling said application processor means,
   a system bus coupled to both said supervisor and application processor means and to said I/O terminal,
   a secure read only memory device also coupled to said system bus and controlled by said supervisor processor means, said secure read only memory device having contents defining a second set of operations, unique from said first set for execution by said application processor means only when said secure read only memory device is enabled by said supervisor processor means,
   a secure read/write memory device coupled to said system bus, said secure read/write memory device including means enabling response of said source read/write memory device to signals on said system bus only on enablement by said supervisor processor means,
   whereby said application processor means, responsive to external commands via said system bus, is prohibited from performing operations requiring access to said secure read only memory device absent enablement of said secure read only memory device by said supervisor processor means.

2. The logically secure processor of claim 1 in which said secure read/write memory device is a non-volatile memory device.

3. A coprocessor implementing a software asset protection system requiring protection of application decryption keys comprising the logically secure processor as claimed in claim 1 which further includes means to store said application decryption keys in said secure read/write memory device.

4. A coprocessor as claimed in claim 3 in which:
   said supervisor processor means includes means to enable reading of said secure read/write memory device to extract therefrom an application decryption key,
   said application processor means for executing software in accordance with a first set of operations includes general data processing capabilities,
   said secure read only memory device having contents defining said second set of operations including decryption function means for decrypting an application relying on an application decryption key read, under control of said supervisor processor means.

5. A coprocessor as claimed in claim 4 in which said supervisor processor means includes:
   a dedicated read only memory device with contents defining a third set of operations, and
   means for writing into said secure read/write memory device for storing and destroying application decryption keys in accordance with said third set of operations.

6. A coprocessor as claimed in claim 5 in which said supervisor processor means includes means for fetching instructions exclusively from said dedicated read only memory device.

7. A coprocessor as claimed in claim 5 in which said application processor means includes an application read/write memory means for storing a decrypted application and wherein said supervisor processor means includes means to clear said application read/write memory means prior to each time an application is written therein.

8. A logically secure processor comprising:
   application processor means including an application microprocessor and application read only and read/write memory devices for executing software stored in said application read/write memory device in accordance with contents of said application read only memory device,
   supervisor processor means including a supervisor microprocessor and associated memory devices coupled via a dedicated signal path, said supervisor processor means including a read only memory device with contents defining operations not contained in said application processor means and only executable by said supervisor microprocessor,
   a system bus coupled to said application microprocessor, said supervisor microprocessor and to both said application read only and read/write memory devices,
   a secure read only memory device also coupled to said system bus with a control terminal driven by said supervisor processor means, said secure read only memory device having contents defining a secure set of operations different from operations contained within said application processor means for execution by said application processor means when said secure read only memory device is enabled by said supervisor processor means, and
   I/O service means coupled to said system bus for input/output operation,
   whereby said application processor means, responsive to external commands, is prohibited from performing operations requiring access to said secure read only memory device absent enablement of said secure read only memory device by said supervisor processor means.

9. The logically secure processor of claim 8 which further includes:
a secure read/write memory device coupled to said system bus with a control terminal driven by said supervisor processor means, said secure read/write memory device including means preventing response of said secure read/write memory device to signals on said system bus in absence of enablement by said supervisor processor means.

10. The logically secure processor of claim 9 in which said secure read/write memory device is a non-volatile memory device.

11. A coprocessor implementing a software asset protection system requiring protection of application decryption keys comprising the logically secure processor as claimed in claim 10 in which said secure read/write memory device includes means to store said application decryption keys.

12. A coprocessor as claimed in claim 11 in which:
said supervisor processor means includes means to enable reading said secure read/write memory device to extract therefrom an application decryption key,
said application processor means for executing software in accordance with a first set of executable operations includes general data processing capabilities,
said secure read only memory device having contents defining said secure set of operations including at least decryption function means for decrypting an application relying on an application decryption key read, under control of said supervisor processor means.

13. A coprocessor as claimed in claim 12 in which:
said supervisor processor means includes a dedicated read only memory device with contents exclusively defining a third set of instructions, and
means for writing into said secure read/write memory device for storing and destroying application decryption keys in accordance with said third set of instructions.

14. A coprocessor as claimed in claim 13 in which said supervisor processor means includes means for fetching instructions exclusively from said dedicated read only memory device.

15. A coprocessor as claimed in claim 14 in which said supervisor processor means includes means to clear said application read/write memory device prior to each time an application is written therein.

16. A computer system implementing a software asset protection scheme requiring protection of application decryption keys comprising:
a host including at least a host processor,
a logically secure coprocessor coupled to said host processor, said logically secure coprocessor including:
application processor means including an application microprocessor for executing software in accordance with the first set of operations, supervisor processor means including a supervisor microprocessor coupled to and controlling said application processor means,
a system bus coupled to both said supervisor and application processor means and to said host processor,
a secure read only memory device also coupled to said system bus and controlled by said supervisor processor means, said secure read only memory device having contents defining a second set of operations for execution by said application processor means when said secure read only memory device is enabled by said supervisor processor means, said second set of operations unique with respect to said first set of operations,
whereby said application processor means, responsive to external commands via said system bus, is prohibited from performing operations requiring access to said secure read only memory device absent enablement of said secure read only memory device by said supervisor processor means.

17. The computer system of claim 16 wherein said logically secure coprocessor further includes:
a secure read/write memory device coupled to said system bus, said secure read/write memory device including means enabling response of said read/write memory device to signals on said system bus only on enablement by said supervisor processor means.

18. The computer system of claim 17 wherein said logically secure coprocessor further includes:
means to store application decryption keys in said secure read/write memory device.

19. The computer system of claim 18 wherein:
said supervisor processor means includes means to enable reading of said secure read/write memory device to extract therefrom an application decryption key,
said first set of operations executed by said application processor means includes general data processing capabilities,
said second set of operations of said secure read only memory device including decryption function means for decrypting an application relying on an application decryption key read, under control of said supervisor processor means.

20. The computer system of claim 19 wherein said supervisor processor means includes:
a dedicated read only memory device with contents defining a third set of operations, and
means for writing into said secure read/write memory device for storing and destroying application decryption keys in accordance with said third set of operations.

21. The computer system of claim 20 wherein said supervisor processor means includes means for fetching instructions exclusively from said dedicated read only memory device.

22. The computer system of claim 21 wherein said application processor means includes an application read/write memory means for storing a decrypted application and wherein said supervisor processor means includes means to clear said application read/write memory means prior to each time an application is written therein.

* * * * *